United States Patent
Tseng et al.

(10) Patent No.: US 10,120,688 B2
(45) Date of Patent: Nov. 6, 2018

(54) DATA PROCESSING SYSTEM AND METHOD FOR EXECUTING BLOCK CALL AND BLOCK RETURN INSTRUCTIONS

(71) Applicant: Andes Technology Corporation, Hsin-Chu (TW)

(72) Inventors: Jen-Chih Tseng, Taoyuan (TW); Hong-Men Su, Hsinchu County (TW); Chuan-Hua Chang, Taipei (TW)

(73) Assignee: Andes Technology Corporation, Hsin-Chu (TW)

( * ) Notice: Subject to any disclaimer, the term of this patent is extended or adjusted under 35 U.S.C. 154(b) by 114 days.

(21) Appl. No.: 15/352,517

(22) Filed: Nov. 15, 2016

(65) Prior Publication Data
US 2018/0136934 A1    May 17, 2018

(51) Int. Cl.
| G06F 9/30 | (2018.01) |
| G06F 9/32 | (2018.01) |
| G06F 9/44 | (2018.01) |
| G06F 9/448 | (2018.01) |

(52) U.S. Cl.
CPC .......... *G06F 9/30054* (2013.01); *G06F 9/322* (2013.01); *G06F 9/4486* (2018.02)

(58) Field of Classification Search
CPC .... G06F 9/3005; G06F 9/30054; G06F 9/322; G06F 9/3806; G06F 9/4486
See application file for complete search history.

(56) References Cited

U.S. PATENT DOCUMENTS

| 4,454,580 A * | 6/1984 | Page | G06F 9/30054 |
| | | | 711/E12.013 |
| 4,486,831 A * | 12/1984 | Wheatley | G06F 12/1483 |
| | | | 711/E12.096 |
| 5,740,461 A | 4/1998 | Jaggar | |
| 2012/0117359 A1* | 5/2012 | Shutkin | G06F 9/30054 |
| | | | 712/208 |

FOREIGN PATENT DOCUMENTS

| CN | 1395168 A | 2/2003 |
| TW | 200410143 | 6/2004 |
| TW | 200421174 | 10/2004 |
| TW | 201423389 A | 6/2014 |
| TW | I470548 B | 1/2015 |
| TW | 201504948 A | 2/2015 |

* cited by examiner

*Primary Examiner* — Benjamin P Geib
(74) *Attorney, Agent, or Firm* — Winston Hsu (57) ABSTRACT

A data processing system includes a control register, a program counter and a controller. The control register is used to store a level status of an execution flow and at least one return address. When the controller reads a block call instruction while a level status of the execution flow has an initial value, the controller stores a return address of the block call instruction in the control register, increments a value of the level status, and redirects the execution flow to a target address indicated by the block call instruction. When the controller reads a block return instruction and the value of the level status is not equal to the initial value, the controller decrements the value of the level status. If the value of the level status becomes equal to the initial value, the controller redirects the execution flow to the return address.

18 Claims, 8 Drawing Sheets

DATA PROCESSING SYSTEM AND METHOD FOR EXECUTING BLOCK CALL AND BLOCK RETURN INSTRUCTIONS

BACKGROUND OF THE INVENTION

1. Field of the Invention

The present invention relates to a data processing system and a method for controlling an execution flow, and more particularly, to a data processing system utilizing program block calls to reduce common program blocks stored in memory and a method utilized on the data processing system as well.

2. Description of the Prior Art

The size of program codes is a critical issue in data processing systems as it affects the storage size of a memory, and thereby a critical factor for determining the manufacturing cost.

Figure 1:
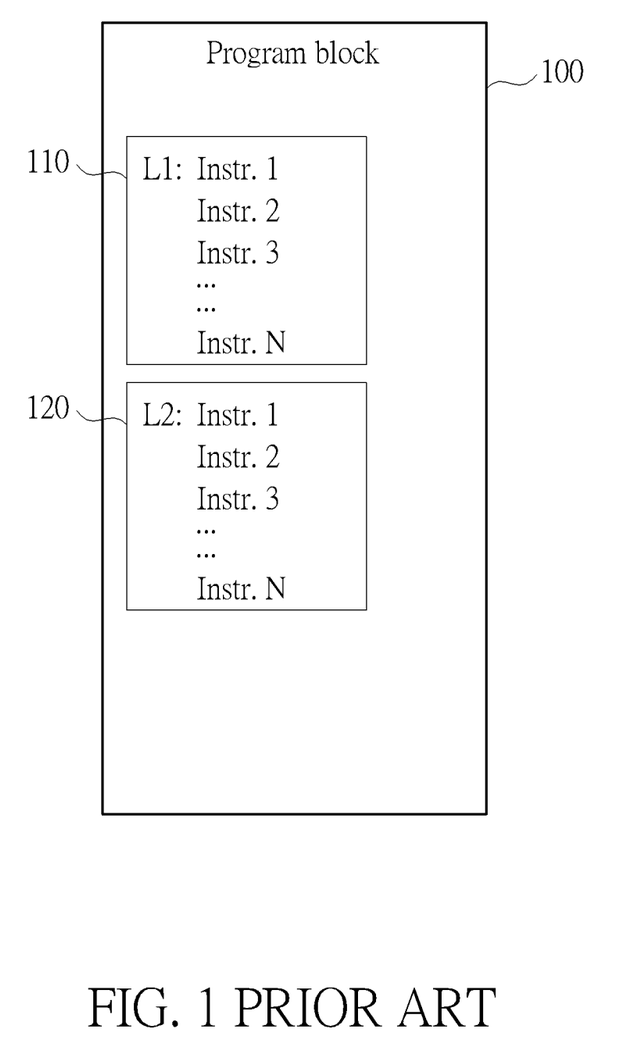
FIG. 1 illustrates a prior art program block.

FIG. 1 illustrates a prior art program block 100. In the program block 100, a label L1 is utilized for marking the start of a sub-program block 110, and a label L2 is utilized for marking the start of a sub-program block 120, where contents of the sub-program block 110 and the sub-program block 120 are the same. Because of the same contents, there will be redundant codes in the program block 100. Code redundancy of the program block 100 gets worse when there are more sub-program blocks having the same contents as the sub-program blocks 110 and 120. Note that the sequence of execution flows of both the sub-program blocks 110 and 120 is assumed to be top-down and line-by-line, under the assumption that there are no conditional or unconditional control transfer instructions in the sub-program blocks 110 and 120.

In the instruction representations of programs, there are many small blocks appearing in multiple places. Examples are address calculation of the same variables, jump to the same addresses, simple arithmetic sequence, etc.

One technique to reduce the size of program codes for small common blocks is to extract common blocks of instructions within a program, to arrange said common blocks as functions (or subroutines), and to call said functions from various positions via function call instructions within the program. The functions normally end at a return instruction to transfer the program execution flow back to the instruction immediately following the caller, i.e. the instruction making the function call in the program.

However, the conventional function call mechanism has some disadvantages. First, the function cannot be directly executed without going through a function call sequence. Second, both sides of the conventional function call and the function itself may need instructions or operations to handle the input arguments and return values, and save/restore some used registers. In addition, conventional function call mechanism needs to save/restore return address in order to handle nested calls. These disadvantages make the conventional functions unsuitable for small common blocks.

A simple mechanism is to utilize a general-purpose register to automatically save/restore the return address while making a function call/return. The mechanism has some disadvantages. First, the function call mechanism needs additional instructions to back up the general-purpose register before making a function call and to recover the general-purpose register after returning from a function. Second, the function call mechanism requires one or more return instructions within a function which makes the program blocks of a function unable to be reused as part of non-function program blocks.

An improved mechanism is to utilize a special register to save the return address, to avoid utilizing additional instructions to handle the return address. Additionally, a counter is utilized for specifying the number of instructions to be executed so that the need of return instructions can be eliminated, and that the same sequence of instructions can be more preferably shared.

Another improved mechanism is to switch the execution flow to a special program micro-PC after the execute block instructions, a special function call, and keeping the return address in the original program counter (PC). Similarly, this mechanism utilizes a counter to specify the number of instructions to be executed.

Both counter mechanisms mentioned above have the disadvantage of an overhead in program code size to initialize the counter value, either by dedicated instructions or by embedding the value in the function call instruction, which reduces the instruction encoding bits available for the target address field. The counter mechanisms are also unsuitable to handle the common blocks with control transfer instructions such as conditional branches, unconditional branches, and conventional function calls, where the number of instructions to be executed is indeterminable before the program is actually executed. Furthermore, the counter mechanisms cannot handle nesting of the function call mechanism efficiently.

SUMMARY OF THE INVENTION

One embodiment of the present invention discloses a method of controlling an execution flow for running a program in a data processing system. When a first block call instruction in the program is read while a level status of the execution flow has an initial value, store a return address of the first block call instruction in the control register, increment a value of the level status, and redirect the execution flow to a target address indicated by the first block call instruction. When a block return instruction corresponding to the first block call instruction in the program is read while the value of the level status is not equal to the initial value, decrement the value of the level status. After decrementing the value of the level status, if the value of the level status is equal to the initial value of the level status, redirect the execution flow to the return address of the first block call instruction.

Another embodiment of the present invention discloses a data processing system. The data processing system includes a control register, a program counter and a controller. The control register is used to store a level status of an execution flow for running a program of the data processing system and at least one return address. The program counter is used to hold a current address of the execution flow. The controller is used to control operations of the data processing system. When the controller reads a first block call instruction in the program while a level status of the execution flow has an initial value, the controller stores a return address of the first block call instruction in the control register, increments a value of the level status, and redirects the execution flow to a target address indicated by the first block call instruction. When the controller reads a block return instruction corresponding to the first block call instruction in the program while the value of the level status is not equal to the initial value, the controller decrements the value of the level status. After the controller decrements the value of the level status, if the value of the level status is equal to the initial value of the level status, the controller redirects the execution flow to the return address of the first block call instruction.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ".

Figure 2:
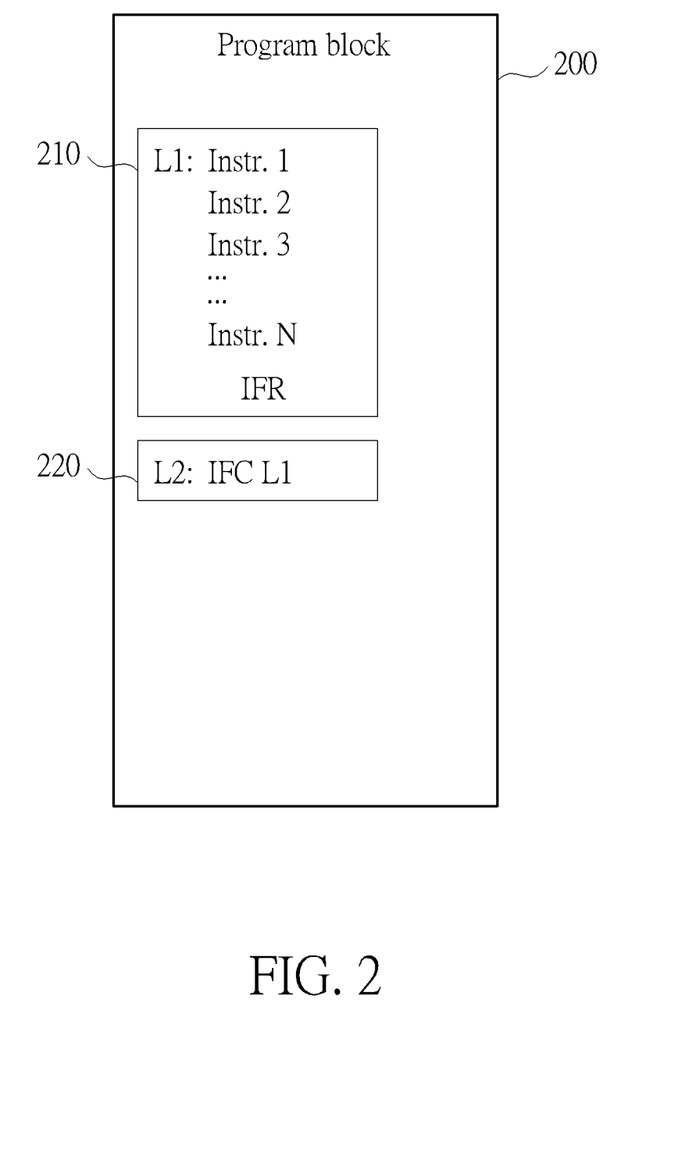
FIG. 2 illustrates a program block of an embodiment of the present invention.

FIG. 2 illustrates a program block 200 of an embodiment of the present invention. The program block 200 has a smaller size than the program block 100, and is generated by applying block call/return instructions on the original program block 100 according to one embodiment of the present invention, for eliminating code redundancy in the program block 100.

In the program block 200, the sub-program block 210 include the same contents as the sub-program block 110, however, the sub-program block 210 further includes an instruction "IFR" added at the end of the sub-program block 210 to return the execution flow back to the caller of the sub-program block 210.

In the program block 200, and as for the label L2, contents of the sub-program block 120 are replaced by a block call instruction to the sub-program block 210 in a newly-generated sub-program block 220, i.e., a block call instruction IFC shown in contents of the sub-program block 220. Note that the block call instruction "IFC L1" shown in FIG. 2 is used to redirect the execution flow to where the label L1 indicates, i.e. the start of the sub-program block 210, where the label L1 indicates a parameter taken by the instruction IFC.

Therefore, when the label L2 in the program block 200 is read in the execution flow, i.e. the start of the sub-program block 220, the execution flow is redirected to the sub-program block 210 of the program block 200, and is then redirected back to a return address of the instruction IFC, which is a program address following the sub-program block 220, right after the execution of the sub-program block 210 is completed.

Apparently, the above-mentioned code redundancy is eliminated in the program block 200 by replacing repeated program codes, i.e. previous contents of the sub-program block 120 is replaced by merely a corresponding block call instruction with the label L1 as its parameter. With the aid of the abovementioned mechanism of the embodiment, the space for storing program codes in a memory utilizing the abovementioned mechanism can be reduced significantly, and hardware loading of the memory can be significantly relieved.

Figure 3:
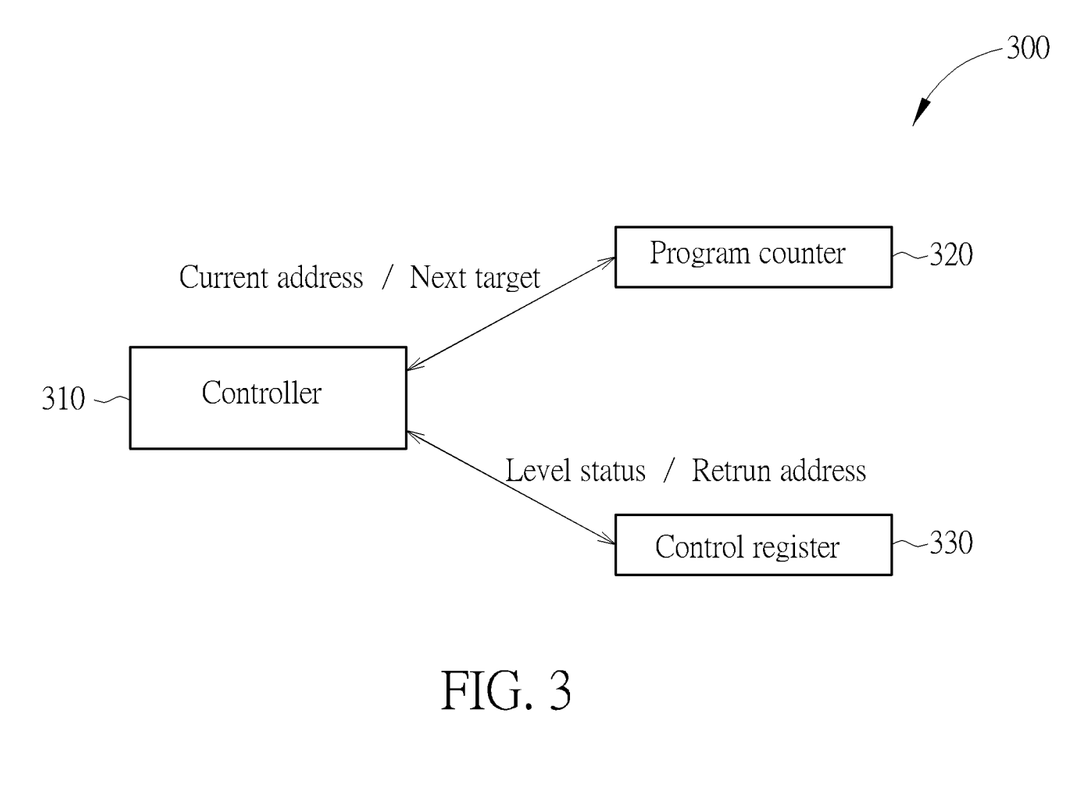
FIG. 3 illustrates a data processing system for performing block call/return instructions according to an embodiment of the present invention.

FIG. 3 illustrates a data processing system 300 for performing block call/return instructions according to an embodiment of the present invention. As shown in FIG. 3, the data processing system 300 includes a controller 310, a program counter 320, and a control register 330.

The controller 310 is used to control operations of the data processing system 300. The program counter 320 is used to hold a current address of the execution flow run by the controller 310. The control register 330 is used to store some required statuses of the execution flow for running a program of the data processing system 300, where the required statuses may include the level status of the execution flow and/or at least one return address of at least one block call instruction in the program. The level status has a predetermined initial value. As the execution flow proceeds, the value of the level status can be incremented or decremented. In one embodiment of the present invention, when the level status is used to indicate a level count, the predetermined initial value may be zero. When a block call instruction is read, the level count may be incremented by one. When a block return instruction is read, the level count may be decremented by one.

Since the data processing system 300 includes the control register 330 to store the return address and the level status of the execution flow, the controller 310 can keep track of the block call instruction and the block return instruction.

Figure 4:
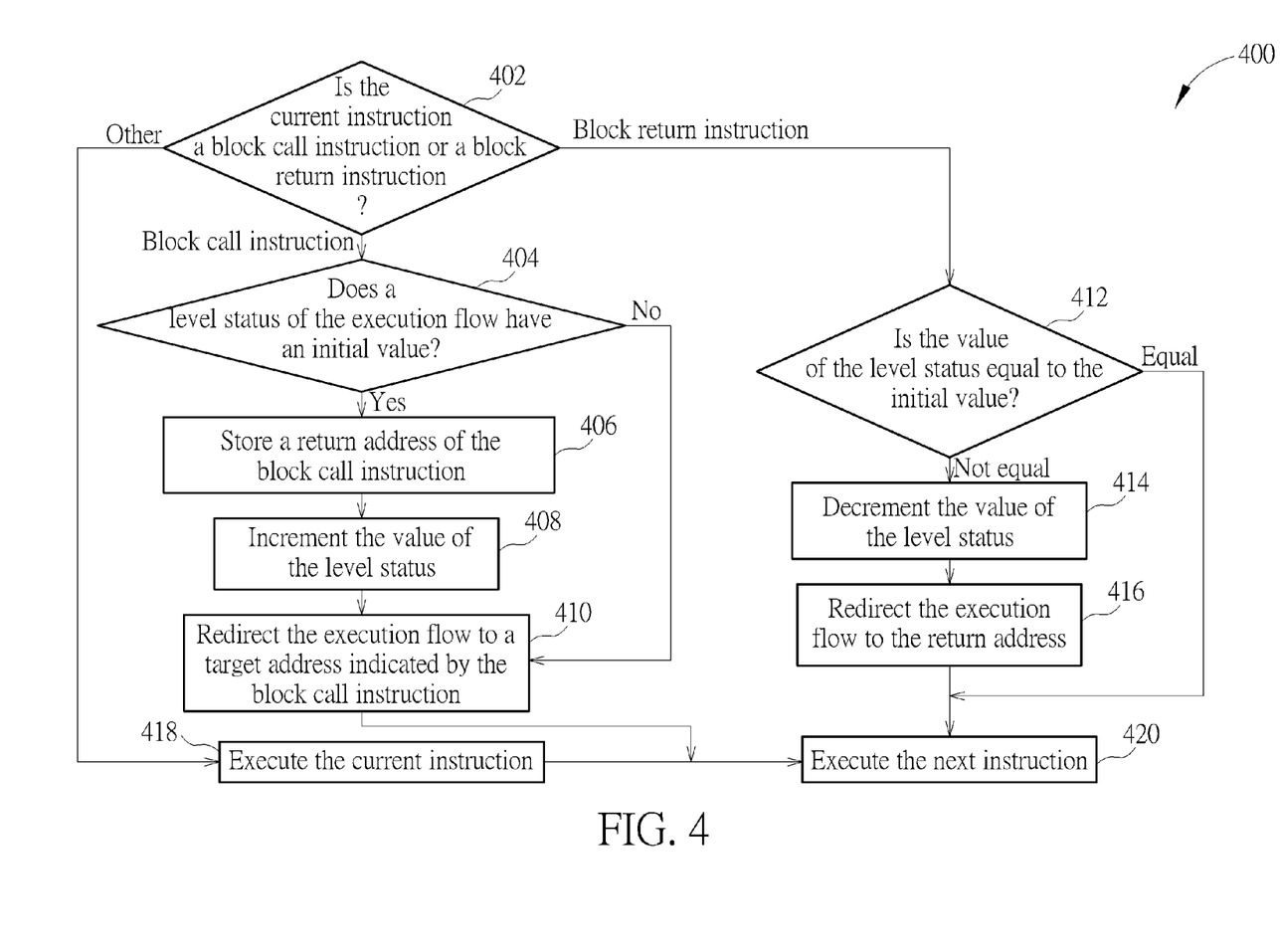
FIG. 4 illustrates a flowchart of a method for controlling an execution flow according to one embodiment of the present invention.

FIG. 4 shows a flowchart of the method 400 for controlling an execution flow according to one embodiment of the present invention. In FIG. 4, the execution flow is returned to a first block call instruction when a block return call is read, so the method 400 merely requires two values for the level status. Therefore, in one embodiment of the present invention, the level status can be implemented as a binary status with two states, STA and STB, where STA may be predetermined as an initial value of the level status and STB may be set as another value other than the initial value of the level status.

As shown in FIG. 4, the method 400 includes the following steps but is not limited by the following order:

Step 402: check if the current instruction is a block call instruction, if so, go to Step 404; else if the current instruction is a block return instruction, go to Step 414; else go to Step 418;

Step 404: check if a level status of the execution flow has an initial value; if so, go to Step 406; else go to Step 410;

Step 406: store a return address of the block call instruction;

Step 408: increment the value of the level status;
Step 410: redirect the execution flow to a target address indicated by the block call instruction, and go to Step 420;
Step 412: check if the value of the level status is equal to the initial value; if not, go to Step 414; else go to Step 420;
Step 414: decrement the value of the level status;
Step 416: redirect the execution flow to the return address, and go to Step 420;
Step 418: execute the current instruction; and
Step 420: execute the next instruction.

When the current instruction is read, the type of the current instruction will be checked in Step 402. If the current instruction is a block call instruction, Step 404 will be performed accordingly. If the current instruction is a block return instruction, Step 412 will be performed. Otherwise, Step 418 will be performed to execute the current instruction. In Step 404, the level status of the execution flow is checked to see if it has an initial value. The block call instruction read in Step 402 may or may not be the first block call instruction in the execution flow of FIG. 4. If the block call instruction in Step 402 is the first block call instruction of the execution flow, then in Step 404, the level status of the execution flow should have the initial value. Otherwise in Step 404, the level status of the execution flow should not have the initial value.

In Steps 406 to 408, if the level status has the initial value, a return address of the block call instruction is stored in the control register and the value of the level status is incremented. In one embodiment of the present invention, the return address can be the program address following the block call instruction, and the value of the level status may be updated from STA to STB, i.e. from 0 to 1.

In Step 410, the execution flow is redirected to a program block indicated by a target address of a block call instruction regardless whether the value of the level status is equal to the initial value or not.

After the execution flow is redirected to the program block indicated by the target address of the block call instruction, a block return instruction may be read in Step 402. The value of the level status is checked to see if it is equal to the initial value in Step 412. In this case, since the value of the level status is not equal to the initial value, in Steps 414 and 416, the value of the level status is decremented and the execution flow is redirected to the return address.

In some embodiments of the present invention, a block return instruction may be read before a block call instruction. In this case, since there is no block call instruction read before, the level status should be equal to the initial value. Therefore, the execution flow will move to the next instruction directly according to Step 412 and Step 420.

To further explain how the data processing system 300 can be used to reduce the memory usage by reducing program codes with the method 400, Table 1 shows the original program blocks and a first modified program blocks for the data processing system 300 according to one embodiment of the present invention.

TABLE 1

| Scheme | PB1 | PB2 | PB3 |
|---|---|---|---|
| Original Program block | AA BB CC | AA BB | BB |
| First Modified | L1: IFC L2 CC | L2: AA IFC L3 | L3: BB IFR |
| Program block | | | |

The first row of Table 1 includes three program blocks PB1, PB2 and PB3. The second row of Table 1 shows that the first program block PB1 includes sub-program blocks AA, BB and CC in a program sequence. The second program block PB2 includes sub-program blocks AA and BB in a program sequence. The third program block PB3 includes a sub-program block BB. Each of the sub-program blocks AA, BB and CC may contain at least one instruction. The third row of Table 1 shows how each of the original program blocks PB1, PB2 and PB3 can be modified to save code size with the data processing system 300 according to one embodiment of the present invention.

The run-time program sequence of the first modified program block of the program block PB1 run by the controller 310 includes the following:
1. Execute the block call instruction "IFC L2" indicated by label L1 in the first modified program block of the program block PB1:
   a. since the value of the level status is equal to the initial value STA, the controller 310 increments the value of the level status from STA to STB, and stores the return address of the block call instruction IFC L2 to the control register 330, where the return address may be the program address following the block call instruction IFC L2; and
   b. the controller 310 redirects the execution flow to the target address of the block call instruction, i.e. the sub-program AA in the first modified program block of the program block PB2 indicated by the label L2.
2. Execute the sub-program block AA pointed by the label L2 in the first modified program block of the program block PB2.
3. Execute the block call instruction "IFC L3" in the first modified program block of the program block PB2:
   a. since the value of the level status is STB, not equal to the initial value STA, the level status and the return address register remain unchanged; and
   b. the controller 310 redirects the execution flow to the label L3, i.e. the location of the sub-program BB in the first modified program block of the program block PB3.
4. Execute the sub-program block BB pointed by the label L3 in the first modified program block of the program block PB3.
5. Execute the block return instruction "IFR" in the first modified program block of the program block PB3:
   a. since the value of the level status is STB, not equal to the initial value STA, the controller 310 decrements the value of the level status from STB to STA; and
   b. the controller 310 redirects the execution flow to the return address stored in the control register 330, i.e. the location of the sub-program block CC in the first modified program block of the program block PB1.
6. Execute the sub-program block CC in the first modified program block of the program block PB1.

As shown in Table 1, the original program block of the program block PB1 contains sub-program blocks AA, BB and CC, however the first modified program block of the program block PB1 contains only the block call instruction "IFC L2" indicated by label L1 and the sub-program block CC. Thus the code size is reduced dramatically. The overhead required by the data processing system 300 is very small. It only requires the control register 330 to store the value of the level status and the return address of the first block call instruction, which is the return address of the block call instruction "IFC L2".

Figure 5:
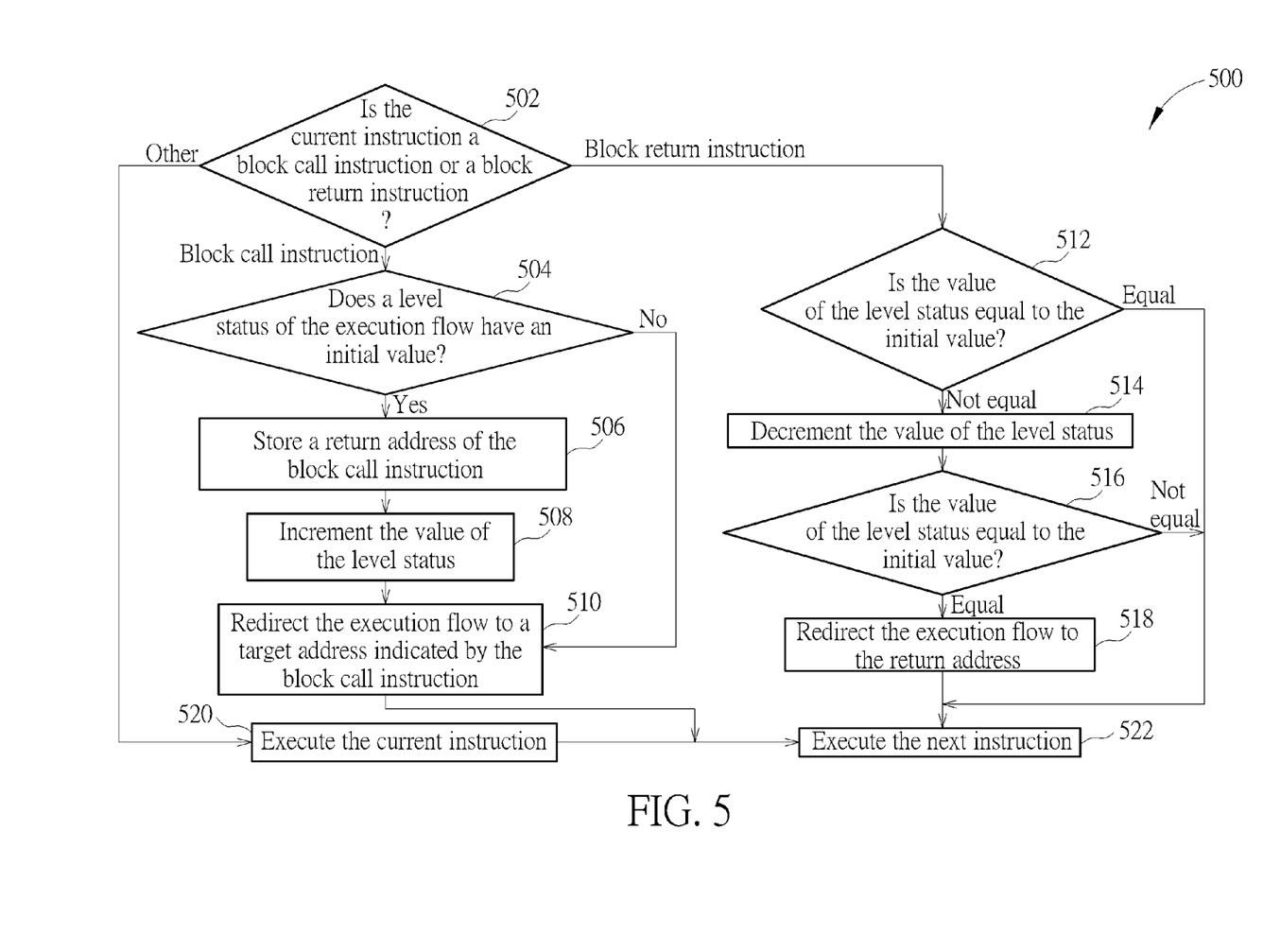
FIG. 5 illustrates a flowchart of a method for controlling an execution flow according to another embodiment of the present invention.

FIG. 5 shows a flowchart of the method 500 for controlling an execution flow according to another embodiment of the present invention. In FIG. 5, the execution flow will not returned to a first block call instruction until a block return call corresponding to the first block call is finally read. In one embodiment of the present invention, the level status can be implemented as a level count, which may be a nonnegative integer and may have an initial value 0. The level status may be incremented when a block call instruction is read in the execution flow, and may be decremented when a block return instruction is read in the execution flow.

As shown in FIG. 5, the method 500 includes the following steps but is not limited by the following order:

Step 502: check if the current instruction is a block call instruction, if so, go to Step 504; else if the current instruction is a block return instruction, go to Step 512; else go to Step 520;

Step 504: check if a level status of the execution flow has an initial value; if so, go to Step 506; else go to Step 508;

Step 506: store a return address of the block call instruction;

Step 508: increment the value of the level status;

Step 510: redirect the execution flow to a target address indicated by the block call instruction, and go to Step 522;

Step 512: check if the value of the level status is equal to the initial value; if not, go to Step 514; else go to Step 522;

Step 514: decrement the value of the level status;

Step 516: check if the value of the level status is equal to the initial value, if so, go to Step 518; else go to Step 522;

Step 518: redirect the execution flow to the return address, and go to Step 522;

Step 520: execute the current instruction; and

Step 522: execute the next instruction.

When the current instruction is read, the type of the current instruction will be checked in Step 502. If the current instruction is a block call instruction, Step 504 will be performed accordingly. If the current instruction is a block return instruction, Step 512 will be performed. Otherwise, Step 520 will be performed to execute the current instruction. In Step 504, the level status of the execution flow is checked to see if it has an initial value. The block call instruction read in Step 502 may or may not be the first block call instruction in the execution flow of FIG. 5. If the block call instruction read in Step 502 is the first block call instruction of the execution flow, then in Step 504, the level status of the execution flow should have the initial value. Otherwise in Step 504, the level status of the execution flow should not have the initial value.

In Step 506, if Step 504 identifies that the value of the level status is equal to the initial value, a return address of the block call instruction is stored in the control register; however, if the value of the level status is not equal to the initial value, no return address will be stored.

In Steps 508-510, the value of the level status is incremented by a predetermined step size and the execution flow is redirected to a target address indicated by the block call instruction no matter the value of the level status is equal to the initial value or not. In one embodiment of the present invention, the value of the level status can be incremented by one.

After the execution flow is redirected to the program block indicated by the target address of the block call instruction, a block return instruction may be read in Step 502. The value of the level status is checked to see if it is equal to the initial value in Step 512. In this case, since the value of the level status is not equal to the initial value, the value of the level status is decremented in Step 514. The value of the level status is checked again in Step 516 to see if the value of the status is equal to the initial value after Step 514. If the value of the status is equal to the initial value, the execution flow is redirected to the return address of the block call instruction stored in the control register previously in Step 518.

Step 512 is performed to check if the value of the level status is equal to the initial value because in some cases, the block return instruction may be read without any block call instruction being read beforehand. When that occurs, the block return instruction read can be simply ignored and thus Step 512 is jumping to Step 522 directly.

In Step 522, the next instruction in the execution flow is executed.

To further explain how the data processing system 300 can be used to reduce the memory usage by reducing program codes with the method 500, Table 2 shows the original program blocks and a second modified program blocks for the data processing system 300 according to one embodiment of the present invention.

TABLE 2

| Scheme | PB1 | PB2 | PB3 |
| --- | --- | --- | --- |
| Original Program block | AA BB CC | AA BB | BB |
| Second Modified Program block | L1: IFC L2 CC | L2: AA IFC L3 | L3: BB IFR IFR |

The first row of Table 2 includes three program blocks PB1, PB2 and PB3. The second row of Table 2 shows that the first program block PB1 includes sub-program blocks AA, BB and CC in a program sequence. The second program block PB2 includes sub-program blocks AA and BB in a program sequence. The third program block PB3 includes a sub-program block BB. The third row of Table 2 shows how each of the original program blocks PB1, PB2 and PB3 can be modified to save code size with the data processing system 300 according to one embodiment of the present invention.

The run-time program sequence of the second modified program block of the program block PB1 run by the controller 310 includes the following:

1. Execute the block call instruction "IFC L2" indicated by label L1 in the second modified program block of the program block PB1:
   a. since the value of the level status is equal to the initial value 0, the controller 310 increments the level status from 0 to 1, and stores the return address of the block call instruction IFC L2 to the control register 330, where the return address may be the program address following the block call instruction IFC L2; and
   b. the controller 310 redirects the execution flow to the target address of the block call instruction, i.e. the sub-program AA in the second modified program block of the program block PB2 indicated by the label L2.
2. Execute the sub-program block AA pointed by the label L2 in the second modified program block of the program block PB2.

3. Execute the block call instruction "IFC L3" in the second modified program block of the program block PB2:
   a. since the value of the level status is 1, not equal to the initial value 0, no return address is stored;
   b. the controller 310 increments the value of the level status from 1 to 2; and
   c. the controller 310 redirects the execution flow to the label L3, i.e. the location of the sub-program BB in the second modified program block of the program block PB3.
4. Execute the sub-program block BB in the second modified program block of the program block PB3.
5. Execute the first block return instruction "IFR" in the second modified program block of the program block PB3:
   a. Since the value of the level status is not equal to the initial value 0, the controller 310 decrements the value of the level status from 2 to 1.
6. Execute the second block return instruction "IFR" in the second modified program block of the program block PB3:
   a. Since the value of the level status is not equal to the initial value 0, the controller 310 decrements the value of the level status from 1 to 0; and
   b. Since the value of the level status is equal to the initial value 0 after being decremented, the controller 310 redirects the execution flow to the return address stored in the control register 330, i.e. the location of the sub-program block CC in the second modified program block of the program block PB1.
7. Execute the sub-program block CC in the second modified program block of the program block PB1.

As shown in Table 2, the original program block of the program block PB1 contains sub-program blocks AA, BB and CC, however the second modified program block of the program block PB1 contains only the block call instruction "IFC L2" indicated by label L1 and the sub-program block CC. Thus the code size is reduced dramatically. The overhead required by the data processing system 300 is very small. It only requires the control register 330 to store the value of the level status and the return address of the first block call instruction, which is the return address of the block call instruction "IFC L2".

Furthermore, since the level status can be used to keep track of the number of block call instructions and the number of block return instructions read, the controller 310 is able to identify the dependency between the block call instructions and the block return instructions. Therefore, the program blocks in the method 500 can be reorganized more flexibly than those in the method 400.

Table 3 shows the original program blocks and a second modified program blocks for the data processing system 300 according to the method 500.

TABLE 3

| Scheme | PB1 | PB2 | PB3 |
|---|---|---|---|
| Original Program block | AA<br>BB<br>DD<br>CC | AA<br>BB | BB<br>DD |
| Second Modified Program block | L1: IFC L2<br>CC | L2: AA<br>IFC L3 | L3: BB<br>IFR<br>DD<br>IFR |

In Table 3, the original program block of the program block PB1 further includes a sub-program DD between the sub-program BB and the sub-program CC, and the original program block of the program block PB3 also includes the sub-program DD after the sub-program BB. In this case, the sub-program DD just needs to be added between the two block return instructions in the second modified program block of the program block PB3. Consequently, when the controller 310 reads the block return instruction before the sub-program DD in the second modified program block of the program block PB3, the execution flow will not be redirected to the return address and will keep executing the sub-program DD until the second block return instruction in the second modified program block of the program block PB3 is read.

In addition, the sharing of the sub-program DD in the second modified program block of the program block PB3 doesn't affect the execution flow for the second modified program block of the program block PB2. Since the run-time program sequence of the second modified program block of the program block PB2 will read only one block call instruction "IFC L3", the controller 310 will redirect the execution flow to the return address once the first block return instruction "IFR" is read so the sub-program DD will not be executed.

Therefore, the sub-program DD in the second modified program block of the program block PB3 can be shared by the second modified program block of the program block PB1 without affecting the second modified program block of the program block PB2, which doesn't include the sub-program DD.

Figure 6:
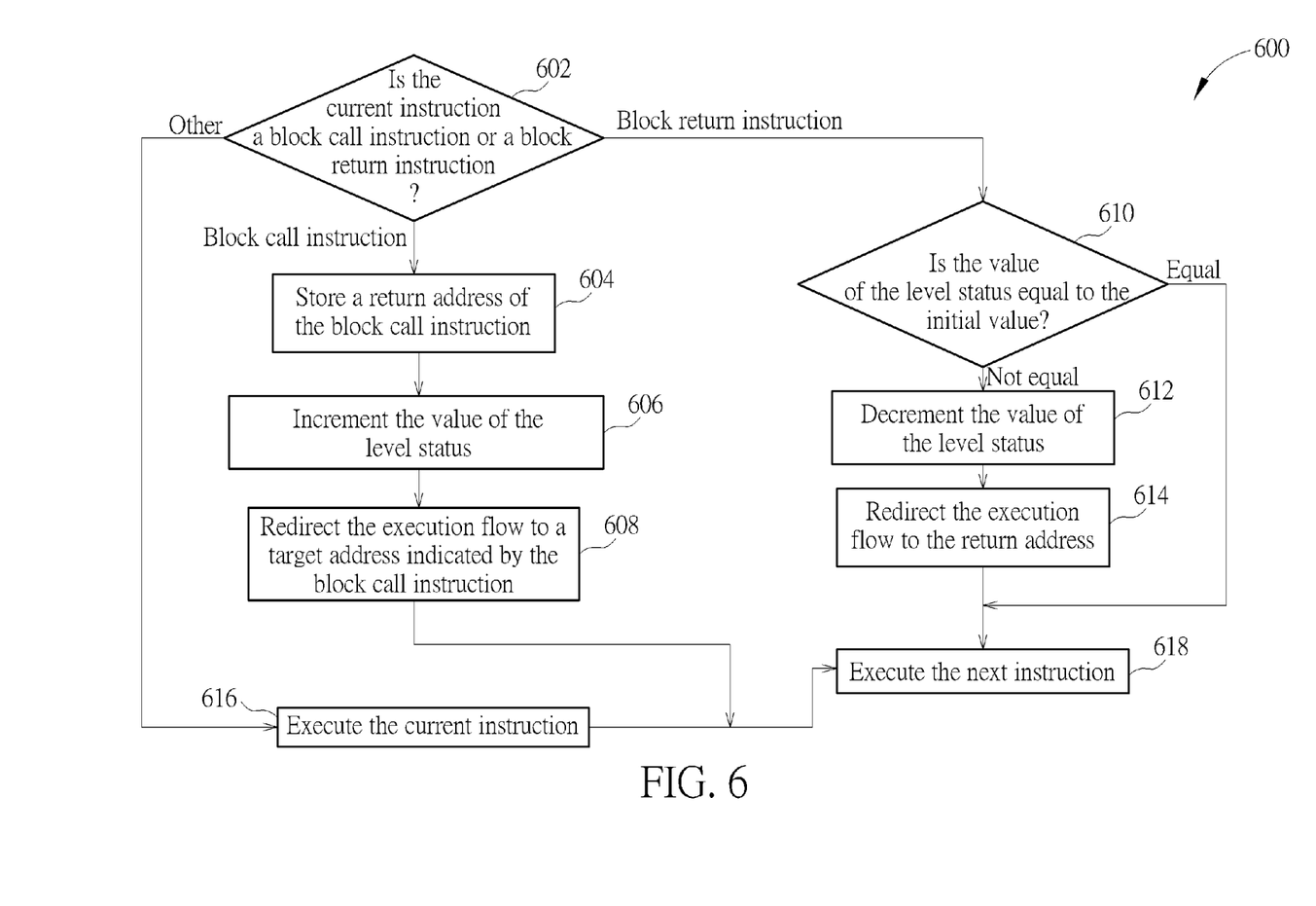
FIG. 6 illustrates a flowchart of a method for controlling an execution flow according to another embodiment of the present invention.

FIG. 6 shows a flowchart of the method 600 for controlling an execution flow according to another embodiment of the present invention. In FIG. 6, the execution flow will return to a previous block call instruction whenever a block return instruction corresponding to a previous block call instruction is read. In one embodiment of the present invention, the level status may be a nonnegative integer and may have an initial value 0. The level status may be incremented when a block call instruction is read in the execution flow, and may be decremented when a block return instruction is read in the execution flow.

As shown in FIG. 6, the method 600 includes steps as the following but is not limited by the following order:
   Step 602: check if the current instruction is a block call instruction, if so, go to Step 604; else if the current instruction is a block return instruction, go to Step 610; else go to Step 616;
   Step 604: store a return address of the block call instruction;
   Step 606: increment the value of the level status;
   Step 608: redirect the execution flow to a target address indicated by the block call instruction, and go to Step 618;
   Step 610: check if the value of the level status is equal to the initial value; if not, go to Step 612; else go to Step 618;
   Step 612: decrement the value of the level status;
   Step 614: redirect the execution flow to the return address, and go to Step 618;
   Step 616: execute the current instruction; and
   Step 618: execute the next instruction.

When the current instruction is read, the type of the current instruction will be checked in Step 602. If the current instruction is a block call instruction, Step 604 will be performed accordingly. If the current instruction is a block return instruction, Step 610 will be performed. Otherwise, Step 616 will be performed to execute the current instruction. In Steps 604 to 608, a return address of the block call instruction is stored in the control register, the value of the level status is incremented and the execution flow is redirected to a target address indicated by a target address of a block call instruction.

After the execution flow is redirected to the program block indicated by the target address of the block call instruction, a block return instruction may be read in Step 602. The value of the level status is checked to see if it is equal to the initial value in Step 610. In this case, since the value of the level status is not equal to the initial value, the value of the level status is decremented in Step 612 and the execution flow is redirected to the return address of the block call instruction stored in the control register previously in Step 614.

Step 610 is performed to check if the value of the level status is equal to the initial value because in some cases, the block return instruction may be read without any block call instruction is read beforehand. When that occurs, the block return instruction in Step 610 is simply ignored and thus Step 610 is jumping to Step 618 directly.

In Step 618, the next instruction in the execution flow is executed.

To further explain how the data processing system 300 can be used to reduce the memory usage by reducing program codes with the method 600, Table 4 shows the original program blocks and a third modified program blocks for the data processing system 300 according to one embodiment of the present invention.

TABLE 4

| Scheme | PB1 | PB2 | PB3 |
|---|---|---|---|
| Original Program block | AA<br>BB<br>CC | AA<br>BB | BB |
| Third Modified Program block | L1: IFC L2<br>CC | L2: AA<br>IFC L3<br>IFR | L3: BB<br>IFR |

The first row of Table 4 includes three program blocks PB1, PB2 and PB3. The second row of Table 4 shows that the first program block PB1 includes sub-program blocks AA, BB and CC in a program sequence. The second program block PB2 includes sub-program blocks AA and BB in a program sequence. The third program block PB3 includes a sub-program block BB. The third row of Table 4 shows how each of the original program blocks PB1, PB2 and PB3 can be modified to save code size with the data processing system 300 according to one embodiment of the present invention.

The run-time program sequence of the third modified program block of the program block PB1 run by the controller 310 includes the following:
1. Execute the block call instruction "IFC L2" indicated by label L1 in the third modified program block of the program block PB1:
   a. the controller 310 increments the level status from 0 to 1, and stores the return address of the block call instruction "IFC L2" to the control register 330, where the return address may be the program address following the block call instruction "IFC L2"; and
   b. the controller 310 redirects the execution flow to the target address of the block call instruction, i.e. the sub-program AA in the program block PB2 indicated by the label L2.
2. Execute the sub-program block AA pointed by the label L2 in the third modified program block of the program block PB2.
3. Execute the block call instruction "IFC L3" in the third modified program block of the program block PB2:
   a. the controller 310 increments the value of the level status from 1 to 2, and stores the return address of the block call instruction "IFC L3" to the control register 330, where the return address is the program address following the block call instruction "IFC L3"; and
   b. the controller 310 redirects the execution flow to the label L3, i.e. the location of the sub-program BB in the third modified program block of the program block PB3.
4. Execute the sub-program block BB in the third modified program block of the program block PB3.
5. Execute the block return instruction "IFR" in the third modified program block of the program block PB3:
   a. since the value of the level status is 2, not equal to the initial value 0, the controller 310 decrements the value of the level status from 2 to 1, and redirects the execution flow to the return address of the block call instruction "IFC L3" stored in the control register 330.
6. Execute the block return instruction IFR in the third modified program block of the program block PB2:
   a. since the value of the level status is 1, not equal to the initial value 0, the controller 310 decrements the value of the level status from 1 to 0, and redirects the execution flow to the return address of the block call instruction "IFC L2" stored in the control register 330.
7. Execute the sub-program block CC in the third modified program block of the program block PB1.

In one embodiment of the present invention, the return addresses of the block call instructions may be stored in consecutive memory locations within the control register 330 with a first-in-last-out data structure, i.e. a stack. Consequently, when the block return instruction is read and the value of the level status is not equal to the initial value, the execution flow can be redirected to the return address that is stored on the top of the stack of the control register 330.

As shown in Table 4, the original program block of the program block PB1 contains sub-program blocks AA, BB and CC, however the third modified program block of the program block PB1 contains only the block call instruction "IFC L2" indicated by label L1 and the sub-program block CC. Thus the code size is reduced dramatically. The overhead required by the data processing system 300 is very small. It only requires the control register 330 to store the value of the level status and the return addresses of the block call instructions.

Figure 7:
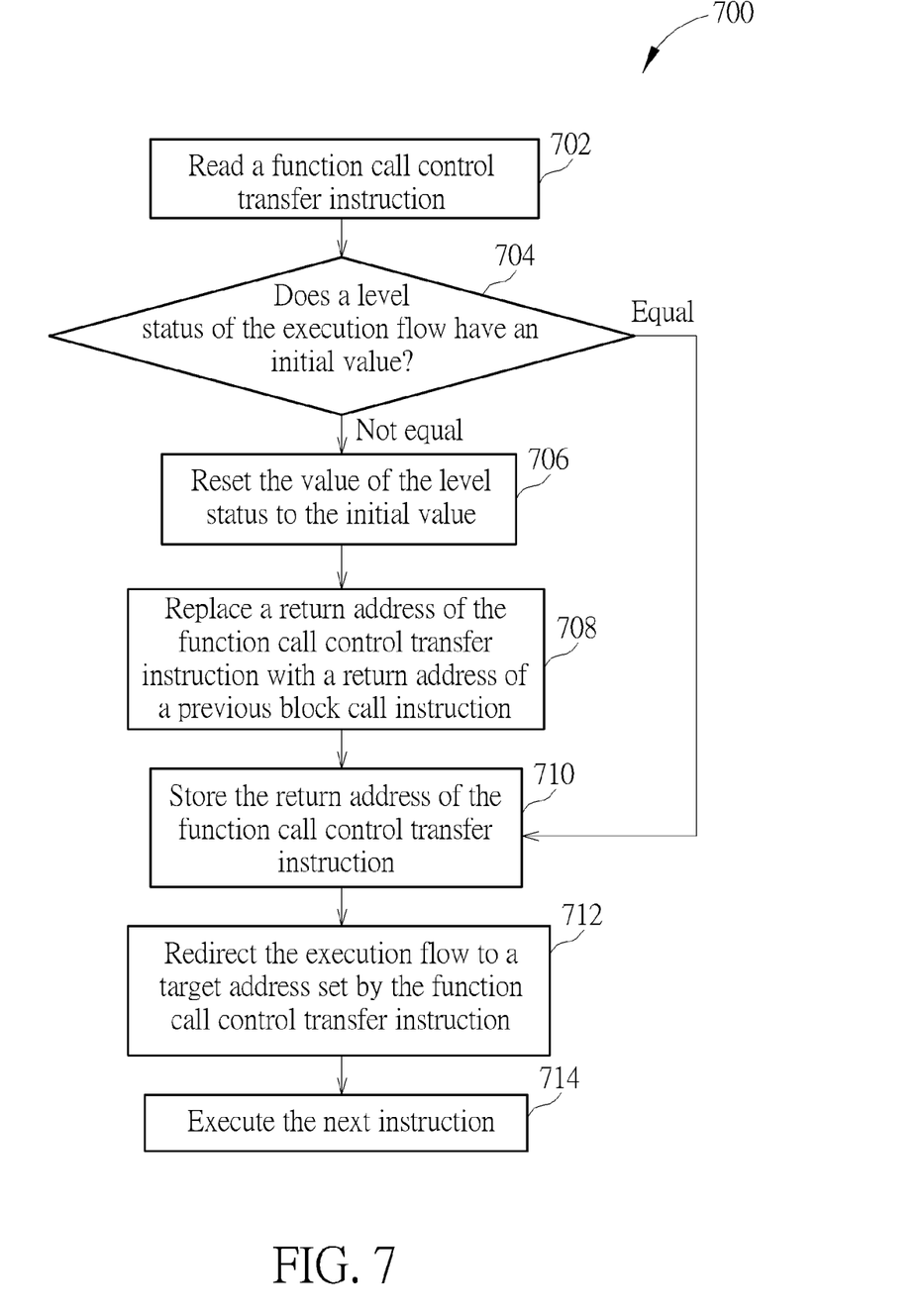
FIG. 7 illustrates a flowchart of a method for controlling an execution flow according to another embodiment of the present invention.
Figure 8:
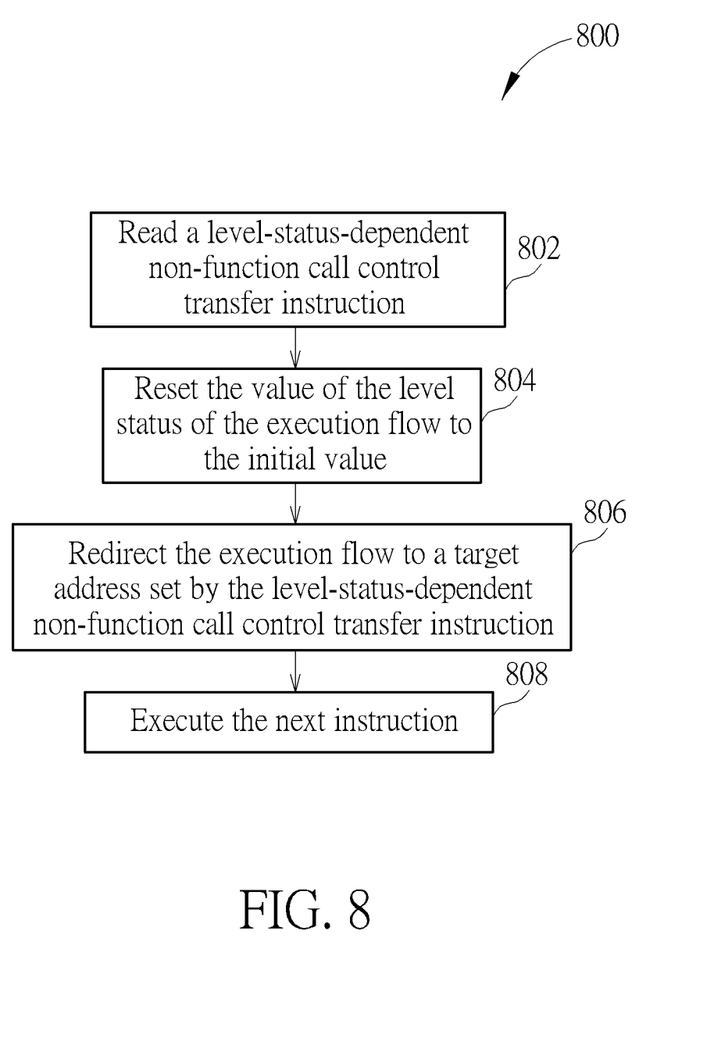
FIG. 8 illustrates a flowchart of a method for controlling an execution flow according to another embodiment of the present invention.

FIGS. 7 and 8 illustrate methods 700 and 800 for handling conditional and unconditional control transfer instructions as part of instructions in a common program block sequence according to embodiments of the present invention. The conditional and unconditional control transfer instructions may be further divided into conventional function call control transfer instructions and other non-function call control transfer instructions. In some embodiments of the present invention, the non-function call control transfer instructions may be a jump instruction, a branch instruction or a function return instruction. Furthermore, the non-function call control transfer instruction can be level-status-independent or level-status-dependent.

The level-status-independent non-function call control transfer instruction won't interfere with the block call/return instructions read previously while the conventional function call control transfer instructions and level-status-dependent non-function call control transfer instructions may interfere with the block call/return instructions read previously and end (or exit) the block call/return sequence.

In FIG. 7, when a function call control transfer instruction is read and a value of a level status is not equal to an initial value, the value of the level status is reset to the initial value and a return address of the function call control transfer instruction is replaced by a return address of a previous block call instruction. For example, in some embodiments, the return address of the function call control transfer instruction can be replaced by the return address of the first block call instruction with the level status being the initial value. The return address of the function call control transfer instruction is stored before the execution flow is redirected to a target address set by the function call control transfer instruction. Then, after the instructions of the function call are executed, the execution flow will be redirected to the stored return address.

As shown in FIG. 7, the method 700 includes the following steps 702 to 714.

Step 702: read a function call control transfer instruction;

Step 704: check if a level status of the execution flow has an initial value; if not, go to Step 706; else go to Step 710;

Step 706: reset the value of the level status to the initial value;

Step 708: replace a return address of the function call control transfer instruction with a return address of a previous block call instruction;

Step 710: store the return address of the function call control transfer instruction;

Step 712: redirect the execution flow to a target address set by the function call control transfer instruction; and Step 714: execute the next instruction.

In some embodiments of the present invention, the level status may always be reset when a function call control transfer instruction is read without further checking. In this case, Step 706 can be merged to Step 708, 710 or 712.

In FIG. 8, when a level-status-dependent non-function call control transfer instruction is read, the value of the level status is reset to the initial value and the execution flow is redirected to a target address set by the function call control transfer instruction. As shown in FIG. 8, the method 800 includes the following steps 802 to 808.

Step 802: read a level-status-dependent non-function call control transfer instruction;

Step 804: reset the value of the level status of the execution flow to the initial value;

Step 806: redirect the execution flow to a target address set by the level-status-dependent non-function call control transfer instruction; and Step 808: execute the next instruction.

For a level-status-independent non-function call control transfer instruction, the execution flow is redirected to a target address set by the level-status-dependent non-function call control transfer instruction directly without resetting the value of the level status since the level-status-independent non-function call control transfer instruction will not affect the block call/return instructions read previously.

The methods 700 and 800 for handling conditional and unconditional control transfer instructions may also be applied on the methods 400-600 so that the methods 400-600 may be further utilized for handling conditional and unconditional control transfer instructions.

In one embodiment of the present invention, the target address of the function call control transfer instruction, the target address of the level-status-independent non-function call control transfer instruction and the target address of the level-status-dependent non-function call control transfer instruction can be an absolute address, an offset relative to the program counter, or an offset relative to one of the return address in the control register.

In summary, the embodiments of the present invention is able to reduce reducing program codes by using the block call instructions and block return instructions in the program. In addition, the methods and the data processing systems require only control registers for the level status of an execution flow for running the program and at least one return address to control the execution flow.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of controlling an execution flow for running a program in a data processing system, comprising:
   when a first block call instruction in the program is read while a level status of the execution flow has an initial value:
      storing a return address of the first block call instruction in a control register;
      incrementing a value of the level status; and
      redirecting the execution flow to a target address indicated by the first block call instruction;
   when a block return instruction corresponding to the first block call instruction in the program is read while the value of the level status is not equal to the initial value, decrementing the value of the level status;
   after decrementing the value of the level status, if the value of the level status is equal to the initial value of the level status, redirecting the execution flow to the return address of the first block call instruction; and
   when a function call control transfer instruction is read while the value of the level status is not equal to the initial value of the level status, resetting the value of the level status to the initial value, replacing a return address of the function call control transfer instruction with a return address of a previous block call instruction, and redirecting the execution flow to a target address indicated by the function call control transfer instruction.

2. The method of claim 1, further comprising when a second block call instruction in the program is read while the value of the level status is not equal to the initial value, redirecting the execution flow to a target address indicated by the second block call instruction.

3. The method of claim 2, further comprising:
   when the second block call instruction in the program is read while the value of the level status is not equal to the initial value, incrementing the value of the level status; and
   when a block return instruction corresponding to the second block call instruction in the program is read while the value of the level status is not equal to the initial value, decrementing the value of the level status;
   wherein the block return instruction corresponding to the second block call instruction in the program is read before the block return instruction corresponding to the first block call instruction in the program is read.

4. The method of claim 3, further comprising:
   when the second block call instruction in the program is read while the value of the level status is not equal to the initial value, storing a return address of the second block call instruction in the control register; and when the block return instruction corresponding to the second block call instruction in the program is read while the value of the level status is not equal to the initial value, redirecting the execution flow to the return address of the second block call instruction.

5. The method of claim 4, wherein the return address of the second block call instruction is a program address following the second block call instruction.

6. The method of claim 1, wherein the return address of the first block call instruction is a program address following the first block call instruction.

7. The method of claim 1, further comprising when the function call control transfer instruction is read while the value of the level status is not equal to the initial value of the level status, storing a return address of the function call control transfer instruction before redirecting the execution flow to the target address indicated by the function call control transfer instruction.

8. A method of controlling an execution flow for running a program in a data processing system, comprising:
when a first block call instruction in the program is read while a level status of the execution flow has an initial value:
storing a return address of the first block call instruction in a control register;
incrementing a value of the level status; and
redirecting the execution flow to a target address indicated by the first block call instruction;
when a block return instruction corresponding to the first block call instruction in the program is read while the value of the level status is not equal to the initial value, decrementing the value of the level status;
after decrementing the value of the level status, if the value of the level status is equal to the initial value of the level status, redirecting the execution flow to the return address of the first block call instruction; and
when a level-status-dependent non-function call control transfer instruction is read while the value of the level status is not equal to the initial value of the level status, resetting the value of the level status to the initial value of the level status and redirecting the execution flow to a target address indicated by the level-status-dependent non-function call control transfer instruction.

9. The method of claim 8, further comprising when a level-status-independent non-function call control transfer instruction is read, redirecting the execution flow to a target address indicated by the level-status-independent non-function call control transfer instruction, wherein the value of the level status remains unchanged.

10. A data processing system, comprising:
a control register configured to store a level status of an execution flow for running a program of the data processing system and at least one return address;
a program counter configured to hold a current address of the execution flow; and
a controller configured to control operations of the data processing system;
wherein:
when the controller reads a first block call instruction in the program while a level status of the execution flow has an initial value, the controller stores a return address of the first block call instruction in the control register, increments a value of the level status, and redirects the execution flow to a target address indicated by the first block call instruction;

when the controller reads a block return instruction corresponding to the first block call instruction in the program while the value of the level status is not equal to the initial value, the controller decrements the value of the level status;

after the controller decrements the value of the level status, if the value of the level status is equal to the initial value of the level status, the controller redirects the execution flow to the return address of the first block call instruction stored in the control register; and when the controller reads a function call control transfer instruction while the value of the level status is not equal to the initial value of the level status, the controller resets the value of the level status to the initial value, replacing a return address of the function call control transfer instruction with a return address of a previous block call instruction, and redirects the execution flow to a target address indicated by the function call control transfer instruction.

11. The data processing system of claim 10, wherein when the controller reads a second block call instruction in the program while the value of the level status is not equal to the initial value, the controller redirects the execution flow to a target address indicated by the second block call instruction.

12. The data processing system of claim 11, wherein:
when the controller reads the second block call instruction in the program while the value of the level status is not equal to the initial value, the controller increments the value of the level status; and
when the controller reads a block return instruction corresponding to the second block call instruction in the program while the value of the level status is not equal to the initial value, the controller decrements the value of the level status;
wherein the controller reads the block return instruction corresponding to the second block call instruction in the program before reading the block return instruction corresponding to the first block call instruction in the program.

13. The data processing system of claim 12, further comprising:
when the controller reads the second block call instruction in the program while the value of the level status is not equal to the initial value, the controller stores a return address of the second block call instruction in the control register; and
when the controller reads the block return instruction corresponding to the second block call instruction in the program while the value of the level status is not equal to the initial value, the controller redirects the execution flow to the return address of the second block call instruction.

14. The data processing system of claim 13, wherein the return address of the second block call instruction is a program address following the second block call instruction.

15. The data processing system of claim 10, wherein the return address of the first block call instruction is a program address following the first block call instruction.

16. The data processing system of claim 10, wherein when the controller reads the function call control transfer instruction while the value of the level status is not equal to the initial value of the level status, the controller stores a return address of the function call control transfer instruction before redirecting the execution flow to the target address indicated by the function call control transfer instruction.

17. The data processing system of claim 10, wherein when the controller reads a level-status-dependent non-function call control transfer instruction, the controller resets the value of the level status to the initial value of the level status and redirects the execution flow to a target address indicated by the level-status-dependent non-function call control transfer instruction.

18. The data processing system of claim 10, wherein when the controller reads a level-status-independent non-function call control transfer instruction, the controller redirects the execution flow to a target address indicated by the level-status-independent non-function call control transfer instruction and the value of the level status remains unchanged.

* * * * *